Patented Mar. 6, 1934

1,949,413

UNITED STATES PATENT OFFICE

1,949,413

TREATMENT OF TEXTILE MATERIALS

George Holland Ellis, Spondon, near Derby, England, assignor to Celanese Corporation of America, a corporation of Delaware No Drawing. Application February 27, 1931, Serial No. 518,897. In Great Britain March 20, 1930

16 Claims. (Cl. 8—5)

This invention relates to the production of coloured pattern effects on materials made of or containing cellulose acetate or other cellulose esters or ethers.

Cellulose acetate and other cellulose esters and ethers may be coloured in a wide range of fast shades by means of colouring matters selected solely from those of the anthraquinone series, more especially colouring matters of comparatively simple constitution, for example amino anthraquinones, hydroxy anthraquinones and mercapto anthraquinones, or derivatives of any of these compounds.

In this manner the materials may be coloured in almost any desired shade from yellow, through orange, scarlet, crimson, heliotrope and violet to blue and blue green. Hitherto, however, no one method has been known whereby these otherwise valuable colouring matters could be employed as a class for the illumination of discharge effects on cellulose ester or ether materials. When such colouring matters are incorporated in formaldehyde sulphoxylate discharges, reduction to the leuco compounds usually takes place during the preparation or application of the preparation, and as the leuco compounds are only re-oxidized with difficulty on the material the true shade of the colouring matter is frequently not attained. Again, in the case of oxidizing discharges, though some of the aforesaid anthraquinone colouring matters are sufficiently resistant to be employed therein, others especially those yielding violet, blue, or blue green shades, are destroyed by the oxidizing agent.

We have now found that these anthraquinone compounds having affinity for cellulose esters or ethers are not appreciably reduced or otherwise affected by stannous compounds which, on the other hand, are capable of discharging many colourations on cellulose esters and ethers, for example those attained by means of insoluble or difficultly soluble colouring matters of the azo or nitrodiarylamine series. As the anthraquinone colouring matters remain in the unreduced state in the presence of stannous compounds they yield their true shades when utilized for the illumination of stannous discharges.

According to the present invention therefore, illuminated discharge effects are produced on materials made of or containing cellulose acetate or other cellulose esters or ethers by means of discharge preparations comprising stannous compounds and unreduced colouring matters of the anthraquinone series having preferably direct affinity for cellulose esters and ethers. In this manner there may be obtained, by the use of discharge preparations of one type only, a wide range of valuable fast discharge effects on cellulose ester and ether materials.

The discharge preparations, which are new and are included in the scope of the present invention, may be prepared with any desired stannous compounds, for example stannous chloride, stannous chloro-acetates, stannous acetate or other stannous salts or double salts. Particularly good results may be obtained by employing the stannous compound wholly or partially in the form of a thiocyanate or in conjunction with a thiocyanate in the manner described in U. S. Application No. 479,087 filed 30th August, 1930. The stannous salts employed may be acid, neutral, or basic and may be produced by interaction of suitable compounds during the preparation of the discharge preparations, or in separate operations as may be desired or convenient.

Any desired unreduced colouring matters of the anthraquinone series may be employed especially such colouring matters as contain a single anthraquinone nucleus. For instance there may be used mono-, di-, or polyaminoanthraquinones whether unsubstituted or substituted in the nucleus or in an amino group or both, for example amino-methylanthraquinones, acidyl-amino-anthraquinones, alkyl-amino-anthraquinones, and substituted-alkyl-aminoanthraquinones e. g. oxyalkylamino-anthraquinones. Again hydroxy- or mercapto-anthraquinones or their ethers or other substitution products may be employed. Sulphonated anthraquinone colouring matters having affinity for cellulose ester or ether materials may likewise be employed, for example monosulphonated colouring matters. As the latter in most cases have also good affinity for animal fibres they are of especial value for use in the production of coloured discharge effects upon mixed materials containing silk, wool, or other animal fibres in addition to cellulose esters or ethers.

In order to illustrate the wide range of colouring matters available we give the following list to which the invention is in no wise restricted:—

| Compound | Shade yeilded on cellulose acetate |
|---|---|
| 1-acetyl-amino-anthraquinone | Lemon yellow. |
| 1-propionyl-amino-anthraquinone | Do. |
| 1-chlor-4-oxy-anthraquinone | Yellow. |
| 1-amino-2-methyl-anthraquinone | Orange. |
| 1-acetyl-amino-4-oxy-anthraquinone | Do. |
| 1-methyl-amino-anthraquinone | Scarlet. |
| 1-ethanolamino-anthraquinone | Do. |
| 1-amino-4-oxy-anthraquinone | Bluish red. |
| 1:4-diamino-2-methoxy-anthraquinone | Do. |
| 1:4-diamino-anthraquinone | Heliotrope. |
| 1-methyl-amino-4-hydroxy-anthraquinone | Violet. |
| 1-methyl-amino-4-amino-anthraquinone | Do. |
| 1:4-di(-mono-methylamino)anthraquinone | Blue. |
| 1:4-diethanolamino-anthraquinone | Do. |
| 1:4-diethanolamino-5:8-dioxy-anthraquinone | Do. |
| 1:5 - di(monomethylamino)4:8 - dioxy - anthraquinone | Do. |
| 1:5-diethanolamino-4:8-dioxy-anthraquinone | Do. |

The above mentioned colouring matters which are insoluble or difficultly soluble are conveniently incorporated in the discharge preparations in the form of aqueous suspensions or dispersions which may or may not be prepared with dispersing agents and/or protective colloids stable towards the other components of the discharge preparations. As the colouring matters may be mixed with one another in any desired proportion it will be appreciated that discharge effects coloured in a wide range of shades may be obtained in accordance with the invention.

If desired, there may be incorporated in the discharge preparation any other agents capable of assisting the discharging action of the stannous compound and/or the fixation of the anthraquinone colouring matter on the cellulose ester or ether material, for example, swelling agents, e. g. hydroquinone, alcohols, organic acids, or phenols. The addition of a swelling agent is particularly beneficial when the stannous compound has not itself a swelling action on the materials treated. Acids or compounds having an acid reaction may be incorporated in the discharge preparations or they may be applied to the fabrics prior to the application of the discharge preparations in the manner described in U. S. Application No. 439,264 filed 26th March, 1930.

The discharge preparations may further contain any desired thickening agents to render them suitable for application by printing, stencilling or other mode of local application.

In producing discharge effects in accordance with the invention various methods of working may be adopted. Thus, for example, a fabric made of cellulose ester yarn may be coloured either uniformly or locally with a dischargeable colouring matter and printed or otherwise locally treated with a discharge preparation comprising a stannous compound and an unreduced colouring matter of the anthraquinone series. If desired, however, the discharge preparation may be applied to an uncoloured fabric and the latter subsequently treated with a dischargeable colouring matter.

After the application of the ground colour and the discharge preparation the goods may be aged or steamed as desired or necessary to effect or complete the action of the discharging preparation and/or to effect fixation of the colouring matters contained therein. The goods may finally be washed and if necessary subjected to any further treatment required to effect or complete the fixation of the colouring matters or may be otherwise finished as desired.

The invention is applicable to the production of coloured discharge effects upon a very wide range of ground colourations, for example, highly satisfactory effects may be produced upon cellulose ester materials which have been coloured by means of insoluble or difficultly soluble colouring matters of the azo and nitrodiarylamine series. As many of these colours, and in addition the anthraquinone colouring matters themselves, have excellent fastness properties, it will be appreciated that the invention enables the easy production of a very wide range of fast coloured discharge effects upon fast coloured grounds.

The invention is applicable to the treatment of textile fabrics or other textile materials made of or containing any desired organic substitution derivatives of cellulose. As examples of such derivatives may be mentioned cellulose esters, for example cellulose acetate, formate, propionate, or butyrate, or the products obtained by treating alkalized cellulose with esterifying agents (e. g. the product known as immunized cotton obtained by treatment with p-toluene-sulphochloride), and cellulose ethers, for example, ethyl, methyl and benzyl cellulose, and the analogous condensation products obtainable from cellulose and glycols or other polyhydric alcohols. Mixed materials containing one or more of the aforementioned cellulose derivatives together with other textile fibres may likewise be treated in accordance with the invention. Such materials may contain, for instance, in addition to a cellulose ester or ether, cotton, wool, silk, or a regenerated cellulose type of artificial silk. Such mixed materials may be coloured in solid or contrasting shades as desired, and the colouration applied to the non-ester or ether portion of the material may be either dischargeable or non-dischargeable according to the effect required. Likewise the discharge preparation for mixed materials may include colouring matters resistant thereto and having affinity for the non-ester or non-ether portion of the material.

The following examples show the best ways known to me of carrying the invention into effect:

*Example 1*

A fabric composed of cellulose acetate yarns and dyed by known means a full shade of red with the dyestuff 2:4-dinitro-benzene-azo-diethylaniline is printed by means of any suitable multi-colour printing machine or by means of hand-blocks or in any other known way, or is stencilled, with three printing pastes as below:—

(1)  500 grams gum arabic 1:1.
 100 grams 1-amino - 2 - methyl-anthraquinone (20% water paste).
 100 grams methylated spirits.
 25 grams potassium sulphocyanide.
 10 grams citric acid.
 115 grams water.
 150 grams stannous chloride.
 ―――
 1000

(2)  500 grams gum arabic 1:1.
 100 grams 1-acetyl - amino-anthraquinone (20% water paste).
 100 grams methylated spirits.
 25 grams potassium sulphocyanide.
 10 grams citric acid.
 115 grams water.
 150 grams stannous chloride.
 ―――
 1000

(3)  500 grams gum arabic 1:1.
 100 grams 1 : 4 - di(monomethylamino) anthraquinone (20% water paste).
 100 grams methylated spirits.
 25 grams potassium sulphocyanide.
 10 grams citric acid.
 115 grams water.
 150 grams stannous chloride.
 ―――
 1000

After printing or stencilling, the goods are dried and afterwards aged or steamed according to known methods to complete the discharge of the ground colour and assist the fixation of the illuminating colours. The goods are then washed or soaped and finished as desired or requisite. A three-colour pattern, namely orange, yellow and blue, is obtained on a bluish-red ground.

*Example 2*

A fabric composed of cellulose acetate yarns and dyed a full shade of violet-blue with the azo dyestuff from diazotized dinitro-o-anisidine and ω-oxyethyl-α-naphthylamine is printed by means of any suitable multi-colour printing machine or by means of hand-blocks or in any other convenient way, or is stencilled, with two printing pastes as follows:—

(1) 500 grams gum arabic 1:1.
    100 1-ethanolaminoanthraquinone (20% water paste).
    100 grams methylated spirits.
    10 grams citric acid.
    140 grams water.
    150 grams stannous chloride.
    ———
    1000

(2) 500 grams gum arabic 1:1.
    50 grams 1:5-di(monomethylamino)-4:8-dioxyanthraquinone (20% water paste).
    50 grams 1-propionyl-amino-anthraquinone.
    100 grams methylated spirits.
    10 grams citric acid.
    136 grams water.
    150 grams stannous chloride.
    4 grams acetate of soda crystals.
    ———
    1000

After printing, the goods are dried and afterwards "aged" or steamed according to known methods to complete the discharge of the ground colour and assist the fixation of the illuminating colours. The goods are then washed or soaped and finished as desired. A two-colour pattern, scarlet and green, is obtained on a violet-blue ground.

*Example 3*

A fabric composed of cellulose acetate yarns and real silk yarns is dyed, the cellulose acetate by means of benzene-azo-1-naphthalene-4-azophenol, and the silk by means of Chlorazol Fast Red K (Colour Index No. 278). The fabric is then printed with the following printing paste:—

500 grams gum arabic 1:1.
20 grams Alizarin direct blue A. powder.
100 grams methylated spirits.
25 grams potassium sulphocyanide.
10 grams citric acid.
195 grams water.
150 grams stannous chloride.
———
1000

After printing, the goods are dried and afterwards steamed according to known methods to complete the discharge of the ground colours and assist the fixation of the illuminating colour. The goods are then washed, or soaped, washed, and dried. A blue pattern on an orange and red "shot" ground is obtained.

What I claim and desire to secure by Letters Patent is:

1. Process for the production of colored discharge effects on materials comprising organic derivatives of cellulose, characterized in that there is applied locally to the materials an acid preparation containing a stannous compound and an unreduced anthraquinone coloring matter which in the unreduced state has an affinity for organic cellulose derivative material.

2. Process for the production of colored discharge effects on materials comprising organic derivatives of cellulose, which comprises coloring the materials with a dischargeable coloring matter and applying locally to the materials an acid preparation containing a stannous compound and an unreduced anthraquinone coloring matter which in the unreduced state has an affinity for organic cellulose derivative material.

3. Process for the production of colored discharge effects on materials comprising cellulose acetate, characterized in that there is applied locally to the material a preparation containing a stannous salt and an unreduced anthraquinone coloring matter which in the unreduced state has an affinity for cellulose acetate material.

4. Process for the production of colored discharge effects on materials comprising cellulose acetate, which comprises coloring the materials with a dischargeable coloring matter and applying locally to the materials a preparation containing a stannous salt and an unreduced anthraquinone coloring matter which in the unreduced state has an affinity for cellulose acetate.

5. Process for the production of colored discharge effects on materials comprising organic derivatives of cellulose, characterized in that there is applied locally to the materials an acid preparation containing a stannous compound which is at least partly in the form of a thiocyanate and an unreduced anthraquinone coloring matter which in the unreduced state has an affinity for organic cellulose derivative material.

6. Process for the production of colored discharge effects on materials comprising cellulose acetate, characterized in that there is applied locally to the materials an acid preparation containing a stannous compound which is at least partly in the form of a thiocyanate, and an unreduced anthraquinone coloring matter which in the unreduced state has an affinity for cellulose acetate material.

7. Process for the production of colored discharge effects on materials comprising organic derivatives of cellulose, which comprises coloring the materials with a dischargeable coloring matter and applying locally to the materials a preparation containing a stannous thiocyanate and an unreduced anthraquinone coloring matter which in the unreduced state has an affinity for organic cellulose derivative material.

8. Process for the production of colored discharge effects on materials comprising cellulose acetate, which comprises coloring the materials with a dischargeable coloring matter and applying locally to the materials a preparation containing a stannous thiocyanate and an unreduced anthraquinone coloring matter which in the unreduced state has an affinity for cellulose acetate material.

9. Process for the production of colored discharge effects on materials comprising organic derivatives of cellulose, characterized in that a preparation containing a stannous salt and an unreduced anthraquinone coloring matter containing only one anthraquinone nucleus is applied locally to the materials.

10. Process for the production of colored discharge effects on materials comprising cellulose acetate, characterized in that a preparation containing a stannous salt and an unreduced anthraquinone coloring matter containing only one anthraquinone nucleus is applied locally to the materials.

11. Process for the production of colored discharge effects on materials comprising organic derivatives of cellulose, which comprises coloring the materials with a dischargeable coloring matter and applying locally to the materials a preparation containing a stannous salt and an unreduced amino anthraquinone coloring matter which in the unreduced state has an affinity for organic cellulose derivative material.

12. Process for the production of colored discharge effects on materials comprising cellulose acetate, which comprises coloring the materials with a dischargeable coloring matter and applying locally to the materials a preparation containing a stannous salt and an unreduced amino anthraquinone coloring matter which in the unreduced state has an affinity for organic cellulose derivative material.

13. Process for the production of colored discharge effects on materials comprising organic derivatives of cellulose, which comprises locally applying to the materials to discharge a dischargeable ground coloration thereon a preparation comprising a stannous thiocyanate a swelling agent for the cellulose derivative materials and an amino anthraquinone dyestuff in the unreduced state and containing only one anthraquinone nucleus.

14. Process for the production of colored discharge effects on materials comprising organic derivatives of cellulose and natural silk, which comprises locally applying to the materials to discharge a dischargeable coloring matter thereon a preparation containing a stannous salt and an unreduced anthraquinone coloring matter having an affinity for the cellulose derivative material while in the unreduced state and which contains a single sulphonic group.

15. An acid discharge preparation comprising a stannous compound and an unreduced anthraquinone coloring matter having an affinity for organic cellulose derivative material while in the unreduced state.

16. A discharge preparation according to claim 15, wherein the stannous compound is at least partly in the form of a thiocyanate.

GEORGE HOLLAND ELLIS.